(12) United States Patent
Kellner et al.

(10) Patent No.: US 11,370,309 B2
(45) Date of Patent: Jun. 28, 2022

(54) BATTERY MODULE OF A TRACTION BATTERY, AND METHOD FOR ASSEMBLING SAME

(71) Applicant: Dr. Ing. h.c. F. Porsche Aktiengesellschaft, Stuttgart (DE)

(72) Inventors: Philipp Kellner, Rennigen (DE); Sascha Mostofi, Zeltingen (DE); Jens Bohlien, Stuttgart (DE); Max Falk, Wiesloch (DE); Alexander Klausmann, Schoenaich (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 87 days.

(21) Appl. No.: 16/894,983

(22) Filed: Jun. 8, 2020

(65) Prior Publication Data
US 2020/0384868 A1  Dec. 10, 2020

(30) Foreign Application Priority Data

Jun. 7, 2019  (DE) ..................... 10 2019 115 471.5

(51) Int. Cl.
*B60L 50/00*  (2019.01)
*B60L 50/64*  (2019.01)
(Continued)

(52) U.S. Cl.
CPC .............. *B60L 50/64* (2019.02); *B60L 50/66* (2019.02); *H01M 10/0413* (2013.01);
(Continued)

(58) Field of Classification Search
CPC ...... B60L 50/64; B60L 50/66; H01M 50/502; H01M 50/20
(Continued)

(56) References Cited

U.S. PATENT DOCUMENTS 9,425,447 B2 * 8/2016 Fritz ................... H01M 50/325
9,461,285 B2 * 10/2016 Klausmann ....... H01M 10/6555
(Continued)

FOREIGN PATENT DOCUMENTS

DE  10 2012 012 891   1/2014
DE  10 2013 218 038   3/2015
(Continued)

OTHER PUBLICATIONS

German Examination Report dated Feb. 13, 2020.

*Primary Examiner* — Hau V Phan
(74) *Attorney, Agent, or Firm* — Gerald E. Hespos; Michael J. Porco

(57) ABSTRACT

A battery module (10) of a traction battery of a motor vehicle has a module housing (13) that is open at opposite ends and closable at the ends. Multiple battery cells (14) are received in the module housing (13) and form battery cell packs (15). At least one first battery cell pack (15) is inserted into the module housing (13) via a first of the open ends of the module housing (13), and at least one second battery cell pack (15) is inserted into the module housing (13) via a second of the open ends of the module housing (13). At least one centering device (16) is inserted into an opening (17) of the module housing (13). The at least one centering device (16) aligns the at least one first battery cell pack (15) and the at least one second battery cell pack (15) in the module housing (13).

8 Claims, 4 Drawing Sheets

(51) Int. Cl.
*B60L 50/60* (2019.01)
*H01M 10/04* (2006.01)
*H01M 50/20* (2021.01)
*H01M 50/502* (2021.01)

(52) U.S. Cl.
CPC ......... *H01M 50/20* (2021.01); *H01M 50/502* (2021.01); *H01M 2220/20* (2013.01)

(58) Field of Classification Search
USPC ........................................................ 180/68.5
See application file for complete search history.

(56) References Cited

U.S. PATENT DOCUMENTS

| | | | | |
|---|---|---|---|---|
| 9,748,538 | B2* | 8/2017 | Fritz | B60L 58/21 |
| 9,987,913 | B2* | 6/2018 | Hara | H01M 50/20 |
| 10,160,492 | B2* | 12/2018 | Fees | B60L 50/66 |
| 10,166,883 | B2* | 1/2019 | Brendecke | B60L 50/66 |
| 10,211,434 | B2 | 2/2019 | Ichikawa et al. | |
| 10,556,483 | B2* | 2/2020 | Werner | F04D 17/16 |
| 10,703,187 | B2* | 7/2020 | Cavus | H01M 50/20 |
| 2012/0045007 | A1* | 2/2012 | Panah | H04L 1/0631 375/267 |
| 2012/0129041 | A1* | 5/2012 | Komazawa | H01M 10/0481 429/158 |
| 2013/0175829 | A1* | 7/2013 | Kim | B62D 21/02 296/204 |
| 2014/0045025 | A1* | 2/2014 | Fritz | H01M 50/20 429/99 |
| 2014/0162105 | A1* | 6/2014 | Klausmann | H01M 50/20 429/120 |
| 2015/0125720 | A1* | 5/2015 | Fujii | H01M 50/20 429/56 |
| 2017/0021740 | A1* | 1/2017 | Brendecke | H01M 10/613 |
| 2018/0109328 | A1* | 4/2018 | Eberhard | G02B 6/4214 |
| 2018/0345778 | A1* | 12/2018 | Yamanaka | B62D 21/02 |
| 2019/0061505 | A1* | 2/2019 | Cavus | H01M 10/625 |

FOREIGN PATENT DOCUMENTS

| | | |
|---|---|---|
| DE | 10 2017 212 941 | 2/2018 |
| DE | 10 2018 205 951 | 10/2019 |
| WO | 2018/071850 | 4/2018 |

* cited by examiner

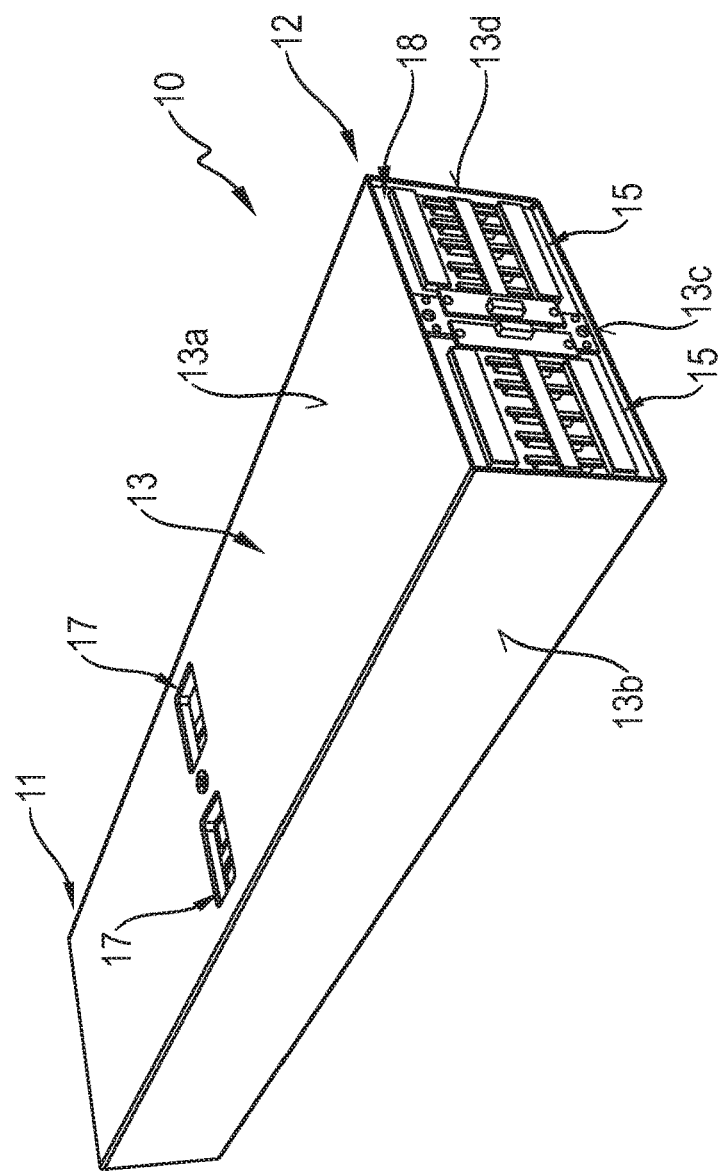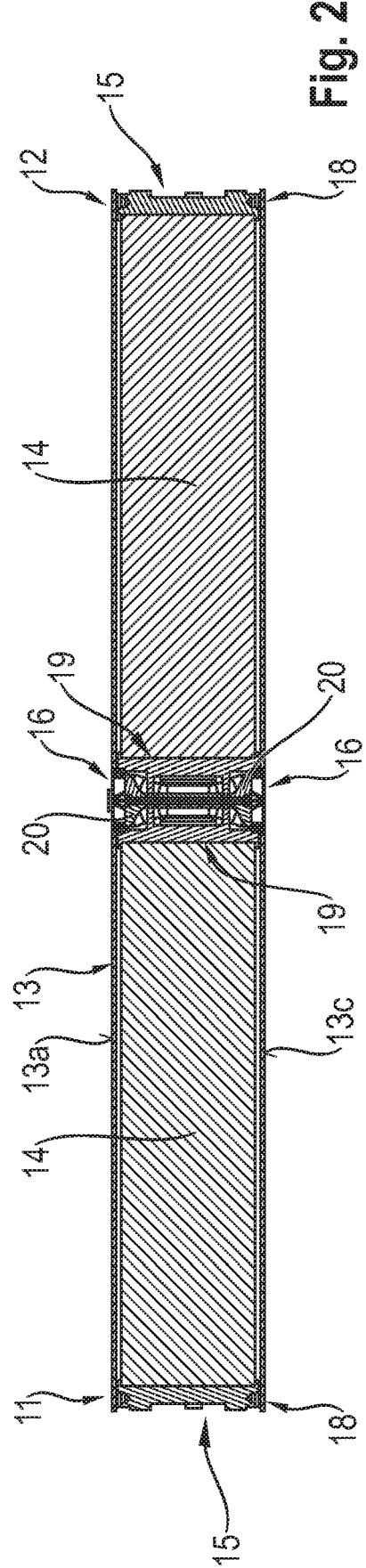

BATTERY MODULE OF A TRACTION BATTERY, AND METHOD FOR ASSEMBLING SAME

CROSS REFERENCE TO RELATED APPLICATION

This application claims priority under 35 USC 119 to German Patent Appl. No. 10 2019 115 471.5 filed on Jun. 7, 2019, the entire disclosure of which is incorporated herein by reference.

BACKGROUND

Field of the Invention

The invention relates to a battery module of a traction battery. In addition, the invention relates to a method for assembling the battery module.

Related Art

A traction battery of a motor vehicle is used for storing electrical energy, and the energy stored in the traction battery can be used to provide drive power at an output of the motor vehicle via an electric machine.

A traction battery typically has multiple battery modules. A battery module of a traction battery has a module housing that is open at opposite ends and closable at the ends. Further, a battery module has multiple battery cells that are received in the module housing. The battery cells can form battery cell packs. The battery cells of a battery cell pack are interconnected electrically with one another. Furthermore, battery cell packs of a battery module and multiple battery modules of a traction battery are interconnected electrically with one another.

Aligning the battery cells or battery cell packs in the module housing of a battery module has presented difficulties to date. There is a need for a battery module in which battery cell packs received in the module housing can be aligned in the module housing easily and exactly.

DE 10 2012 012 891 A1 discloses an apparatus for connecting battery modules. Each battery module has battery cells. Assemblies having hollow-profile channels in which centering elements and spacers engage are positioned at ends of battery cells combined to form a battery module.

DE 10 2013 218 038 A1 discloses a battery case for a traction battery. The battery case is used to receive multiple battery modules.

DE 10 2017 212 941 A1 discloses a battery pack having multiple battery modules. Each battery module has a housing and battery cells received in the housings. The housings of the individual battery modules can be positioned using locating projections and locating depressions and secured to one another.

It is an object of the invention to provide a novel battery module of a traction battery and a method for assembling same.

SUMMARY

The battery module has a module housing that is open at opposite ends and closable at the ends.

The battery module has multiple battery cells received in the module housing that form battery cell packs.

At least one first battery cell pack is inserted into the module housing via a first of the open opposite ends thereof.

At least one second battery cell pack is inserted into the module housing via a second of the open opposite ends thereof.

The battery module has at least one centering device that is inserted into an opening of the module housing. The at least one centering device aligns the at least one first battery cell pack and the at least one second battery cell pack in the module housing.

The battery module has provision for at least one battery cell pack to be introduced into the module housing at each of they opposite open ends of the module housing. These battery cell packs inserted into the module housing from different ends are aligned in the module housing via the at least one centering device that is inserted into a respective opening in the module housing. This allows the battery cells combined to form battery cell packs, and the battery cells are arranged in the module housing from opposite ends, to be aligned with one another easily and exactly.

The centering device aligns the at least one first battery cell pack and the at least one second battery cell pack with one another in the module housing at least in the direction of introduction and preferably also transversely with respect to the direction of introduction of the battery cell pack into the module housing. Thus, exact alignment of the battery cell packs in different directions is achieved.

The centering device may be inserted into the respective opening in a direction perpendicular to the direction of introduction of the battery cell packs into the module housing. This permits flexible handling of the centering devices such that the centering device can be inserted into the respective opening both before the battery cell packs are inserted into the module housing and after the battery cell packs are inserted into the module housing to align the battery cell packs in this manner.

In one embodiment, each battery cell pack has carrier plates that bound the respective battery cell pack at ends thereof. The carrier plates receive high-voltage connections via which the battery cell packs are electrically interconnectable.

The respective centering device may be connected operatively to mutually adjoining carrier plates and/or to the high-voltage connections received by the mutually adjoining carrier plates to align the carrier plates and/or the high-voltage connections. Thus, the centering device aligns first the battery cell packs on their carrier plates and second the high-voltage connections of the battery cell packs. As such, individual battery cell packs subsequently can be interconnected electrically with one another.

Each centering device may have a frame-like base body with outer struts and inner struts. First struts, in particular outer struts, are connected operatively to mutually adjoining carrier plates to align the carrier plates, and second struts, in particular the inner struts, are connected operatively to high-voltage connections received by the mutually adjoining carrier plates to align the high-voltage connections. The outer struts and the inner struts of the frame-like base body of the respective centering device align the carrier plates of the battery cell packs and of the high-voltage connections of the battery cell packs.

Exemplary embodiments of the invention will be explained in more detail, without being restricted to this, with the aid of the drawings.

BRIEF DESCRIPTION OF THE DRAWINGS

FIG. 1 shows a perspective view of a battery module without a cover.

FIG. 2 shows a cross section through FIG. 1.

DETAILED DESCRIPTION

Figure 3:
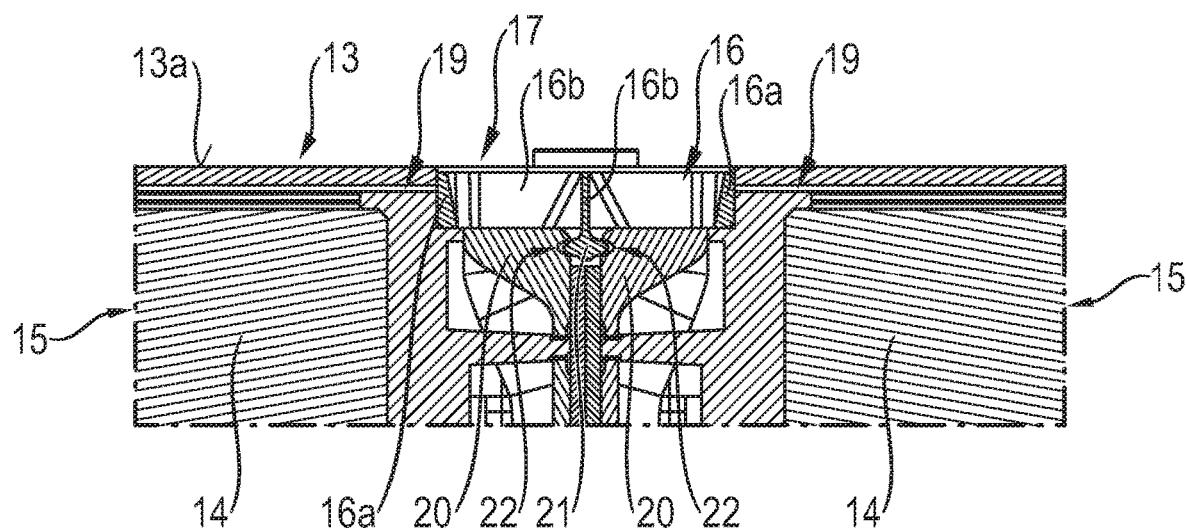
FIG. 3 shows a detail from FIG. 2.

The invention relates to a battery module of a traction battery of a motor vehicle. A traction battery typically comprises multiple battery modules that are electrically interconnected with one another. A traction battery is used for storing electrical energy that can be provided at an output of the motor vehicle as drive power via an electric machine.

A battery module 10 has a module housing 13 that is open at opposite ends 11, 12. The module housing 13 accordingly comprises four sidewalls 13a, 13b, 13c and 13d, which define a cavity for receiving battery cells 14. The battery module 10 further has the battery cells 14 that form battery cell packs 15. In the embodiment shown, the battery cells 14 of the battery module 10 form a total of four battery cell packs 15. Two first battery cell packs 15 are inserted into the module housing 13 via a first end 11 of the open opposite ends 11, 12 of the module housing 13, and two second battery cell packs 15 are inserted into the module housing 13 via a second end 12 of the open opposite ends 11, 12 of the module housing 13. It should be pointed out that the number of battery cell packs 15 inserted into the module housing 10 from the opposite ends 11, 12 is arbitrary. As such, it is possible for a single battery cell pack 15 to be inserted into the module housing 10 from each of the ends 11, 12. Further, it is also possible for more than two battery cell packs 15 to be inserted into the module housing 13 from each of the opposite ends 11, 12.

The module housing 13 can be closed at the opposite open ends 11, 12 using a cover that is not shown in the figures. Preferably, when the battery cell packs 15 have been inserted into the module housing 13 via the opposite ends 11, 12, the module housing 13 is closed at each end 11, 12 by means of at least one cover.

In addition to the module housing 13 and in addition to the battery cell packs 15 inserted into the module housing 13 at the opposite ends 11, 12, the battery module 10 has at least one centering device 16 that is inserted into a respective opening 17 that passes through a wall of the module housing 13. Each opening 17 can also be referred to as a through-opening. In the embodiment shown, the walls 13a and 13c of the module housing 13 each have two openings 17 and a centering device 16 is inserted into each of these openings 17. The at least one centering device 16 aligns the battery cell packs 15 inserted into the module housing 13 from opposite ends 11, 12 in the module housing 13.

The respective centering device 16 aligns the at least one first battery cell pack 15 and the at least one second battery cell pack 15 that are inserted into the module housing 13 from different ends, with one another at least in the direction of introduction of the battery cell packs 15 into the module housing 13 and preferably also transversely with respect to the direction of introduction of the battery cell packs 15 into the module housing 13. The centering device 16 is inserted into the respective opening 17 of the module housing 13 in a direction perpendicular to the direction of introduction of the battery cell packs 15 into the module housing 13.

The module housing 13 has sidewalls 13a, 13b, 13c and 13d and is open at ends.

Battery cell packs 15 are inserted into the module housing 13 from the opposite open ends 11, 12. The sidewalls 13a, 13b, 13c and 13d of the module housing 13 bound the battery cell packs 15 inserted into the module housing 13 on four sides. At least one battery cell packs 15 is inserted into the module housing 13 via a first end 11, and at least one second battery cell pack 15 is inserted via an opposite second end 12. The battery housing 13 is closable at the ends using covers that are not shown.

The alignment of the battery cell packs 15 and the module housing 13, specifically an alignment in the direction of introduction of the battery cell packs 15 into the module housing 13 and an alignment perpendicularly thereto, is effected using the at least one centering device 16, which is inserted into a respective opening 17 in a wall of the battery housing 13.

Preferably, openings 17 are present on opposite walls 13a, 13b of the module housing 13 to insert the centering devices 16 into these openings 17. The centering devices 16 are inserted into the openings 17 in the module housing 13 in a direction perpendicular to the direction of introduction of the battery cell packs 15 into the module housing 13.

The number of centering devices 16 and openings 17 receiving the centering devices 16 is dependent on the number of battery cell packs 15 that are received in the module housing 13. For two battery cell packs 15 that are inserted into the module housing 13 from different ends 11, 12, and that are opposite one another or adjoin one another as seen in the direction of introduction, there are preferably two centering devices 16 that are inserted into corresponding openings 17 of the module housing 13, namely on the opposite walls 13a, 13c of the module housing 13.

Preferably, two battery cell packs 15 inserted into the module housing 13 from different ends 11, 12 are aligned respectively using two centering devices 16, namely a first centering device 16 inserted into an opening 17 in a first wall 13a, and a second centering device 16 inserted into an opening 17 in an opposite wall 13c.

Two battery cell packs 15 that are opposite in the direction of introduction in the module housing 13 preferably are aligned with one another in the module housing 13 using two centering devices 16 that are inserted into the openings 17 of the module housing 13 from two opposite walls 13a, 13c of the module housing 13.

Each battery cell pack 15 of the battery module 10 has the battery cells 14 that are electrically interconnected with one another and carrier plates 18, 19. The respective battery cell pack 15 is bounded at ends by a respective carrier plate 18, 19.

The battery cell packs 15 of the battery module 10 are received in the module housing 13 such that the carrier plates 18, 19 extend into the module housing 13 perpendicularly to the direction of introduction of the battery cell packs 15 and hence are aligned parallel to the ends 11, 12 of the battery housing 13.

In the region of those carrier plates 19 of the battery cell packs 15 that are positioned on the inside, and are opposite one another or border on one another, in the state in which they have been inserted into the module housing 13, the carrier plates 19 of the battery cell packs 15 receive high-voltage connections 20 via which the battery cell packs 15 are electrically interconnectable, namely via high-voltage plugs, not shown, that can be connected to the high-voltage connections 20.

The respective centering device 16 is connected operatively to the mutually adjoining carrier plates 19 and/or to the high-voltage connections 20, received by the mutually adjoining carrier plates 19, of the battery cell packs 15 introduced into the module housing 13 from different sides to align the carrier plates 19 that adjoin one another and the high-voltage connections 20 that are received by the mutually adjoining carrier plates 19 of the mutually adjoining battery cell packs 15.

Figure 4:
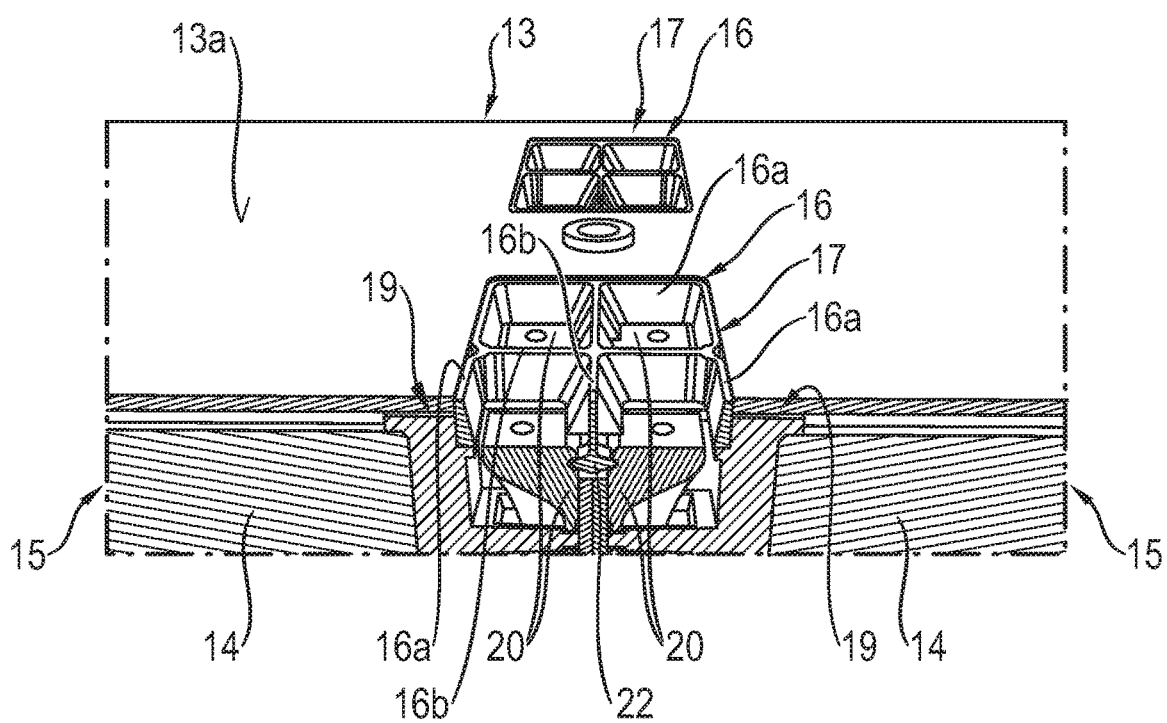
FIG. 4 shows the detail of FIG. 3 in a perspective view.

As FIG. 4 best reveals, the respective centering device 16 is frame-shaped, with a frame-like base body having outer struts 16a and inner struts 16b.

The outer struts 16a are connected operatively to the mutually adjoining carrier plates 19 to align the carrier plates 19 of mutually adjoining cell packs 15 that are opposite one another as seen in the push-in direction.

The inner struts 16b are connected operatively to high-voltage connections 20 received by the mutually adjoining carrier plates 19 to align the high-voltage connections 20 of the battery cell packs 15.

A projection 21 that engages in grooves 22 of the high-voltage connections 20 for aligning the high-voltage connections 20 is formed on at least one of the inner struts 16b, in particular on both inner struts 16b, of the base body of the centering device 16. The respective projection 21 engages with play in the grooves 22 of two opposite or mutually adjoining high-voltage connections 20. This allows the high-voltage connections 20 to be aligned particularly advantageously.

The outer struts 16b of the respective centering device 16 protrude into the mutually adjoining carrier plates 19 of battery cell packs 15 that are opposite one another in the push-in direction to align the carrier plates 19 of these battery cell packs 15 with one another.

The outer struts 16a of the respective centering device 16 may be cone-like. More particularly, the outer struts 16a of the base body of the respective centering device 16 can be in cone-like or sloped form on exterior walls so as to be able to introduce the centering device 16 into the respective opening 17 in the module housing 13. The outer struts 16a of the respective centering device 16 may conically taper on their exterior walls in the direction of introduction of the respective centering device 16 into the respective opening 17 in the module housing 13.

FIGS. 3 and 4 show that the outer struts 16a and the inner struts 16b of the base body of the respective centering device 16 are in cone-like or tapered form on interior walls to form introduction aids for the high-voltage plugs, not shown, that are connectable to the high-voltage connections 20. The outer struts 16a and the inner struts 16b each bound introduction openings for the high-voltage plugs, with the interior walls of the struts 16a, 16b expanding conically in the direction of introduction of the high-voltage plugs into the openings of the respective centering device 16 that are bounded by the struts 16a, 16b.

The invention relates further to a method for assembling a battery module 10 according to the invention. Details in this regard are described below with reference to FIGS. 5a to 5c and FIGS. 6a to 6c.

First, a battery module housing 10 is provided that is open at its ends 11, 12. The module housing 10 is shown alone in FIG. 5a, 6a, with FIG. 5a, 6a each providing a view of a partition 13e of the module housing 13 that divides the cavity defined by the sidewalls 13a, 13b, 13c and 13d into two compartments to insert two battery cell packs 15 into the battery module housing 13 from each end 11, 12.

The battery cell packs 15 comprising multiple battery cells 14 each are provided. The battery cell packs 15 are introduced into the battery module housing 13 from different ends 11, 12, with FIGS. 5c and 6b showing two battery cell packs 15 that are introduced partially into the module housing 13 from the end 12 of the module housing 13. The battery cell packs 15 are introduced into the module housing 13 from both opposite ends 11, 12. As such, at least one first battery cell pack 15 and at least one second battery cell pack 15 are introduced, in particular pushed, into the module housing 13 from a first end 11 and from the opposite second end 12, respectively, with FIGS. 1 and 6c showing the battery cell packs 15 introduced into the module housing 13 from the end 12 in the fully pushed-in state.

Further, the at least one first battery cell pack 15 and the at least one second battery cell pack 15 are aligned in the module housing 13 such that the at least one centering device 16 is inserted into the respective opening 17 of the module housing 13. The centering device 16 is inserted into the respective opening 17 in the module housing 13 in a direction perpendicular to the direction of introduction of the battery cell packs 15 into the module housing 13 while aligning the battery cell packs 15.

Figure 6A:
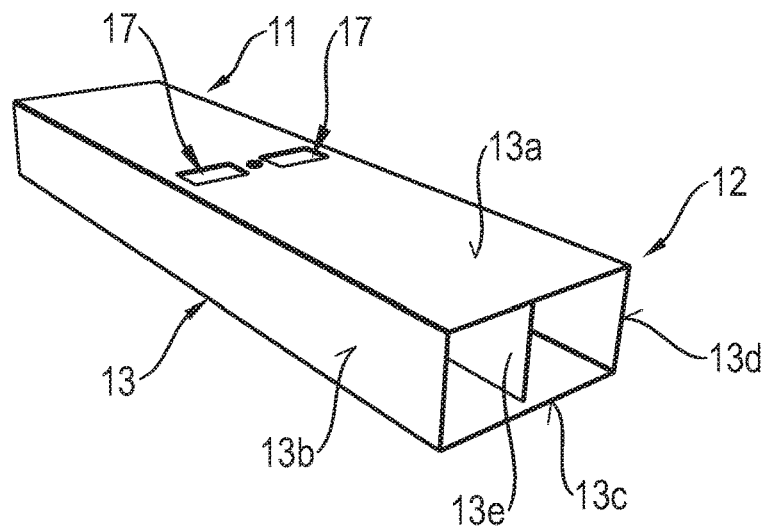
FIGS. 6a to 6c show a further possible sequence for assembling the battery module.
Figure 6B:
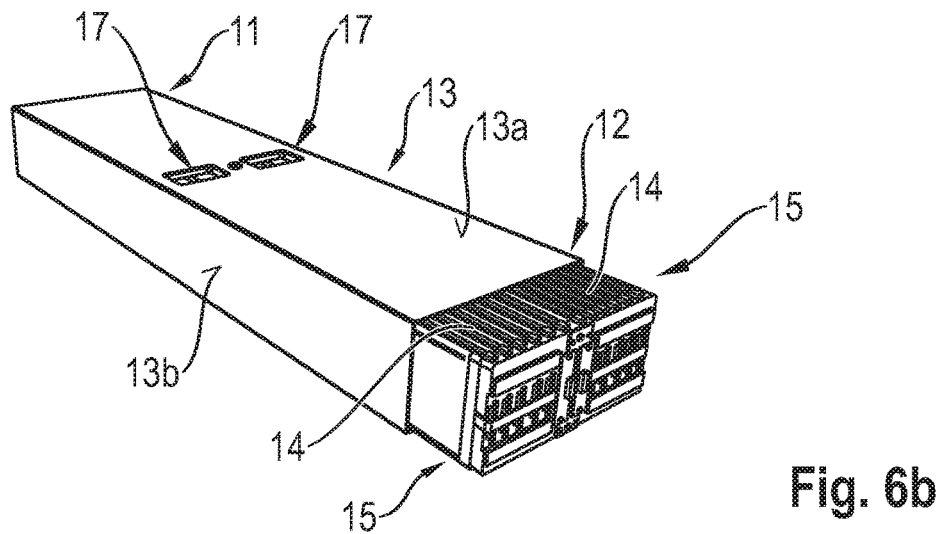
Figure 6C:
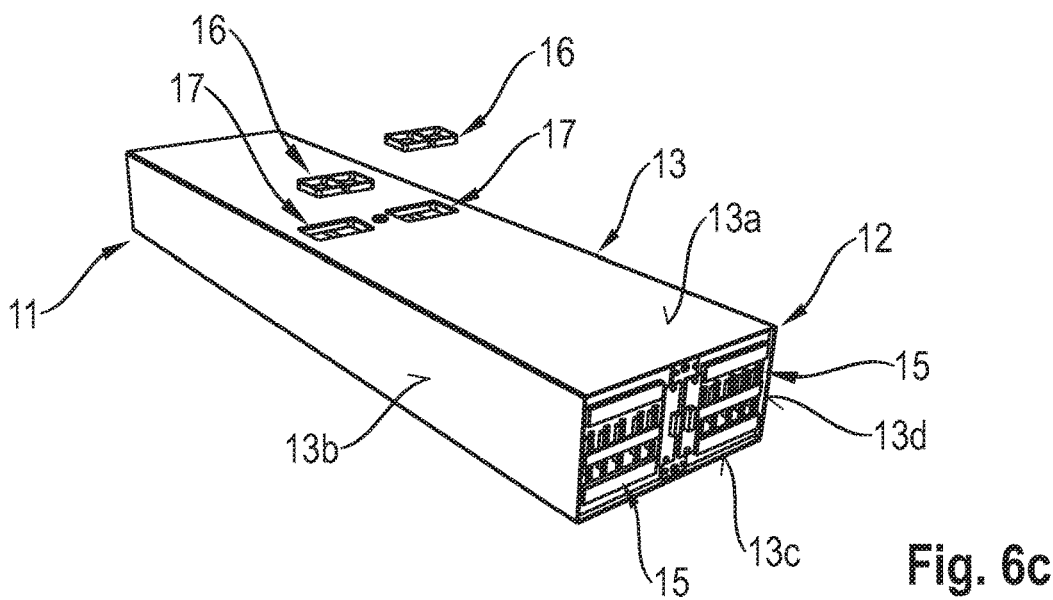

In the mounting sequence of FIGS. 6a, 6b and 6c, the respective centering device 16 is introduced into the respective opening 17 of the module housing 13 when the battery cell packs 15 have already been introduced or inserted fully into the module housing 13. In the mounting sequence of FIG. 6a, 6b, 6c, the battery cell packs 15 are inserted into the module housing 13 first, and only then are the centering devices 16 inserted into the openings 17 in the module housing 13 to perform the alignment.

Figure 5A:
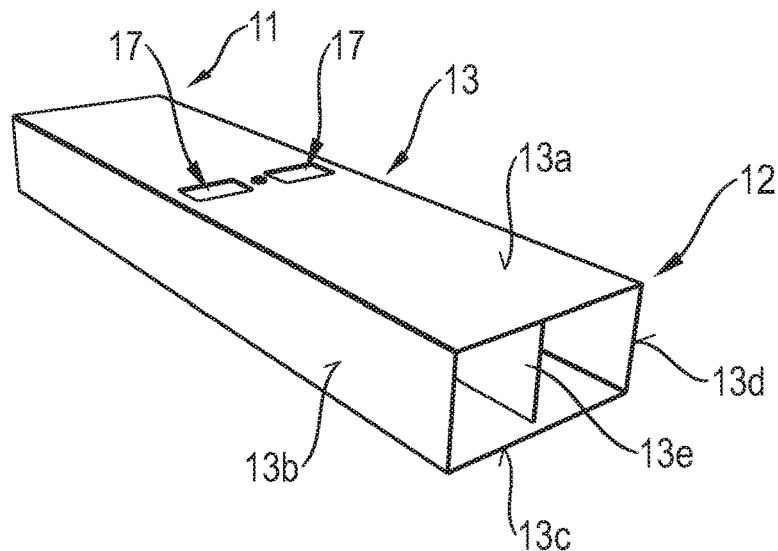
FIGS. 5a to 5c show a possible sequence for assembling the battery module.
Figure 5B:
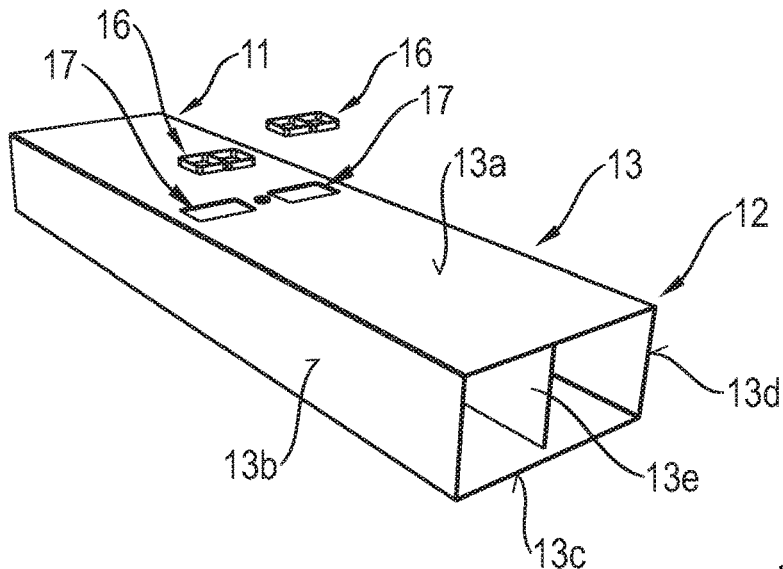
Figure 5C:
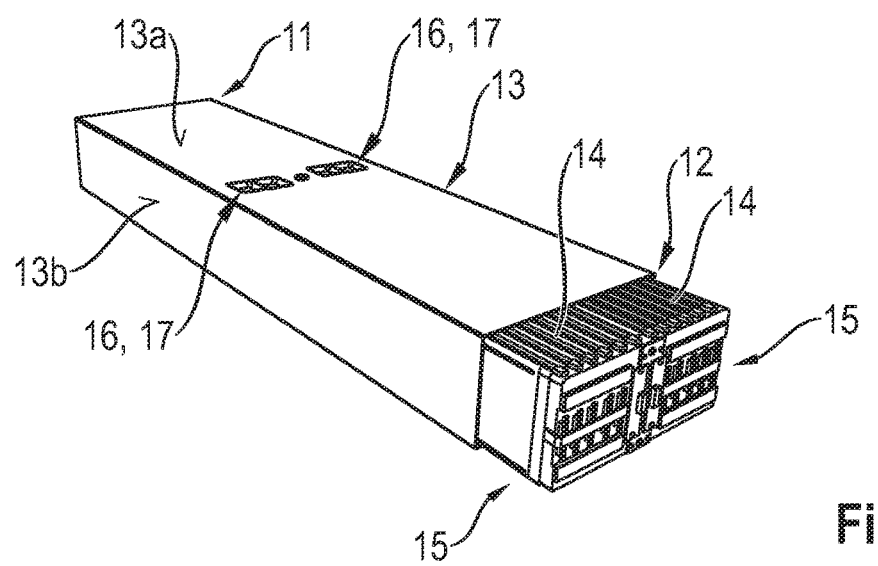

By contrast, according to the mounting sequence of FIGS. 5a, 5b and 5c, it is also possible for the at least one centering device 16 to be inserted into the respective openings 17 in the module housing 13 first, and then the battery cell packs 15 are introduced into the module housing 13 from the different ends 11, 12. Whenever the mounting sequence of FIGS. 5a, 5b and 5c is used, the centering devices 16 inserted into the recesses or openings 17 of the module housing 13 need to be secured against falling out of the respective opening 17, which can occur as a result of the centering device 16 sitting in the respective opening 17 with a press fit. Alternatively, the centering device 16 can also have a collar or at least one projection that rests on the respective sidewall of the module housing 13 to keep the respective centering device 16 in the respective opening 17.

The invention allows battery cell packs to be arranged and aligned in a module housing of a battery module particularly advantageously. This is possible inexpensively using simple means.

What is claimed is:

1. A battery module of a traction battery of a motor vehicle, comprising:
   a module housing having opposite first and second open ends that are selectively closable;
   battery cells that form at least one first battery cell pack that is inserted into the module housing via the first open end of the module housing, and at least one second battery cell pack that is inserted into the module housing via the second open end of the module housing and
   at least one centering device that is inserted into an opening of the module housing, the at least one centering device aligning the at least one first battery cell pack and the at least one second battery cell pack in the module housing, wherein
   the at least one centering device aligns the at least one first battery cell pack and the at least one second battery cell pack with one another in the module housing at least in a direction of insertion and in a direction transverse to the direction of insertion of the battery cell pack into the module housing.

2. The battery module of claim 1, wherein the at least one centering device is inserted into the respective opening in a direction perpendicular to the direction of insertion of the battery cell packs into the module housing.

3. A battery module a traction battery of a motor vehicle, comprising:
a module housing having opposite first and second open ends that are selectively closable;
battery cells that form at least one first battery cell pack that is inserted into the module housing via the first open end of the module housing, and at least one second battery cell pack that is inserted into the module housing via the second open end of the module housing and
at least one centering device that is inserted into an opening of the module housing, the at least one centering device aligning the at least one first battery cell pack and the at least one second battery cell pack in the module housing, wherein
each of the battery cell packs has carrier plates that bound the respective battery cell pack at ends thereof,
the carrier plates of the battery cell packs receive high-voltage connections via which the battery cell packs are electrically interconnectable,
the respective centering device is connected operatively to mutually adjoining carrier plates and/or to the high-voltage connections received by the mutually adjoining carrier plates to align the carrier plates and/or the high-voltage connections.

4. The battery module of claim 3, wherein:
the respective centering device defines a frame-shape with outer struts and inner struts,
first struts of the outer and inner struts of the respective centering device being connected operatively to mutually adjoining carrier plates to align the carrier plates of the battery cell packs,
second struts of the outer and inner struts of the respective entering device being connected operatively to high-voltage connections received by the mutually adjoining carrier plates to align the high-voltage connections of the battery cell packs.

5. The battery module of claim 4, wherein
at least one of the inner struts of the respective centering device has projections that engage in grooves of the high-voltage connections of the battery cell packs to align the high-voltage connections.

6. The battery module of claim 4, wherein
the outer struts of the respective centering device have surfaces that are sloped with respect to an inserting direction of the respective device into the opening of the module housing.

7. The battery module of claim 4, wherein
at least some of the outer struts of the respective centering device have sloped exterior walls aligned to facilitate introduction of the respective centering device into the respective opening in the module housing.

8. The battery module of claim 4, wherein
at least some of the outer struts and/or of the inner struts of the respective centering device have interior walls that are sloped to form introduction aids for high-voltage plugs that are connectable to the high-voltage connections.

* * * * *